United States Patent
Örjmark et al.

(10) Patent No.: US 8,838,120 B2
(45) Date of Patent: Sep. 16, 2014

(54) METHODS AND SYSTEMS FOR A GENERIC MULTI-RADIO ACCESS TECHNOLOGY

(75) Inventors: Jerker Örjmark, Ramlösa (SE); Michael Breschel, Lund (SE); Kent Inge Ingesson, Lund (SE); Robert Klang, Lund (SE); Magnus Malmberg, Södra Sandby (SE)

(73) Assignee: Ericsson Modems SA, Plan-les-Ouates (CH)

( * ) Notice: Subject to any disclaimer, the term of this patent is extended or adjusted under 35 U.S.C. 154(b) by 0 days.

(21) Appl. No.: 13/307,182

(22) Filed: Nov. 30, 2011

(65) Prior Publication Data

US 2012/0309401 A1  Dec. 6, 2012

Related U.S. Application Data

(60) Provisional application No. 61/493,795, filed on Jun. 6, 2011, provisional application No. 61/493,801, filed on Jun. 6, 2011, provisional application No. 61/493,794, filed on Jun. 6, 2011.

(51) Int. Cl.
| | |
|---|---|
| *H04W 72/00* | (2009.01) |
| *H04W 72/12* | (2009.01) |
| *H04W 16/14* | (2009.01) |
| *H04W 72/10* | (2009.01) |
| *H04W 88/06* | (2009.01) |
| *H04W 16/18* | (2009.01) |

(52) U.S. Cl.
CPC .......... *H04W 72/1215* (2013.01); *H04W 16/14* (2013.01); *H04W 72/10* (2013.01); *H04W 88/06* (2013.01); *H04W 16/18* (2013.01)
USPC ......... 455/450; 455/418; 455/550.1; 370/329

(58) Field of Classification Search
CPC ..... H04W 28/04; H04W 8/245; H04W 72/04; H04W 1/72519
USPC ........................ 455/450, 418, 550.1; 370/329
See application file for complete search history.

(56) References Cited

U.S. PATENT DOCUMENTS

| | | | |
|---|---|---|---|
| 7,394,284 | B2 | 7/2008 | Vorbach |
| 7,468,963 | B2 | 12/2008 | Capretta |

(Continued)

FOREIGN PATENT DOCUMENTS

| | | |
|---|---|---|
| EP | 1 388 951 A2 | 2/2004 |
| EP | 1388951 A2 | 2/2004 |

(Continued)

OTHER PUBLICATIONS

Ahmed, Mohamed et al., "A Component-Based Architecture for Cognitive Radio Resource Management", Proceedings of the 4th International Conference on CROWNCOM, Jun. 22-24, 2009, pp. 1-6.

(Continued)

*Primary Examiner* — Danh Le
(74) *Attorney, Agent, or Firm* — Patent Portfolio Builders PLLC

(57) ABSTRACT

Generic devices, systems and methods for multiple radio access technologies (RATs) are described. A platform for allocating radio resources among a plurality of radio access technology (RAT) modules can include, for example, radio hardware configured to transmit and receive radio signals over an air interface using the plurality of RATs; and a radio planner connected to the radio hardware and configured to receive radio time reservation requests, each of which requests includes a priority value for the radio time reservation request, and to determine whether to grant or deny each of the radio time reservation requests based at least in part on the priority values.

19 Claims, 15 Drawing Sheets

(56) References Cited

U.S. PATENT DOCUMENTS

| | | | |
|---|---|---|---|
| 7,487,493 | B1 | 2/2009 | Faulkner |
| 7,496,074 | B2 | 2/2009 | Hepler et al. |
| 7,522,888 | B2 | 4/2009 | Lu |
| 7,546,404 | B2 | 6/2009 | Yeh et al. |
| 7,568,059 | B2 | 7/2009 | Solomon et al. |
| 7,587,577 | B2 | 9/2009 | Royer et al. |
| 7,822,065 | B2 | 10/2010 | Lu |
| 7,886,255 | B2 | 2/2011 | Simar, Jr. et al. |
| 8,271,025 | B2 | 9/2012 | Brisebois et al. |
| 2003/0061260 | A1* | 3/2003 | Rajkumar .................. 709/104 |
| 2004/0053630 | A1 | 3/2004 | Ramos et al. |
| 2004/0127225 | A1* | 7/2004 | Qiu et al. .................. 455/450 |
| 2004/0215855 | A1* | 10/2004 | Fukushima et al. .......... 710/107 |
| 2005/0049843 | A1 | 3/2005 | Hewitt et al. |
| 2008/0240048 | A1* | 10/2008 | Okker et al. ................ 370/338 |
| 2008/0279137 | A1 | 11/2008 | Pernu et al. |
| 2009/0063740 | A1 | 3/2009 | Yeh et al. |
| 2009/0170555 | A1 | 7/2009 | Olvera-Hernandez et al. |
| 2009/0201862 | A1 | 8/2009 | Okker et al. |
| 2009/0232234 | A1 | 9/2009 | Du |
| 2010/0015993 | A1* | 1/2010 | Dingler et al. ............. 455/456.1 |
| 2010/0067433 | A1 | 3/2010 | Cheng et al. |
| 2010/0099393 | A1 | 4/2010 | Brisebois et al. |
| 2010/0167665 | A1 | 7/2010 | Zetterman |
| 2010/0291920 | A1 | 11/2010 | Lerzer et al. |
| 2010/0304685 | A1 | 12/2010 | Wietfeldt et al. |
| 2010/0330977 | A1 | 12/2010 | Kadous et al. |
| 2011/0002246 | A1 | 1/2011 | Li et al. |
| 2011/0261793 | A1* | 10/2011 | Cavalcanti et al. ........... 370/336 |
| 2012/0269173 | A1* | 10/2012 | Chin et al. .................. 370/332 |
| 2012/0289170 | A1 | 11/2012 | Li et al. |
| 2012/0324462 | A1 | 12/2012 | Miljanic et al. |

FOREIGN PATENT DOCUMENTS

| | | |
|---|---|---|
| EP | 1 890 431 A2 | 2/2008 |
| EP | 1890431 A2 | 2/2008 |
| FR | 2853800 A1 | 10/2004 |
| GB | 2468540 A | 9/2010 |
| WO | 90/04233 A1 | 4/1990 |
| WO | 2010/025678 A1 | 3/2010 |
| WO | 2011/046477 A1 | 4/2011 |
| WO | 2011046477 A1 | 4/2011 |
| WO | 2011053891 A2 | 5/2011 |
| WO | 2011056253 A1 | 5/2011 |

OTHER PUBLICATIONS

Zhu, Li et al., "A New Architecture for Cognitive Radio Networks Platform", Wireless Communications, Networking and Mobile Computing, 2008 WiCOM '08, 4th International Conference on Oct. 12-14, 2008, pp. 1-4.

Lattard, Didier et al., "A Reconfigurable Baseband Platform Based on an Asynchronous Network-on-Chip", IEEE Journal of Solid-State Circuits, vol. 43, No. 1, Jan. 2008, pp. 223-235.

Durand, Yves et al., "Faust: On-Chip Distributed SoC Architecture for a 4G Baseband Modem Chipset", http://www.design-reuse.com/articles/12885/faust-on-chip-distributed-soc-architecture-for-a-4g-baseband-modem-chipset.html, pp. 1-5.

International Search Report issued in corresponding International Application No. PCT/EP2012/058734, date of mailing Aug. 6, 2012.

International Preliminary Report on Patentability issued in corresponding International Application No. PCT/EP2012/058734 on Dec. 10, 2013.

International Preliminary Report on Patentability issued in corresponding International Application No. PCT/EP2012/060623 on Dec. 10, 2013.

International Preliminary Report on Patentability issued in corresponding International Application No. PCT/EP2012/060622 on Dec. 10, 2013.

International Search Report in corresponding International Application No. PCT/EP2012/058734 mailed Aug. 16, 2012.

International Search Report in corresponding International Application No. PCT/EP2012/060623 mailed Aug. 16, 2012.

International Search Report in corresponding International Application No. PCT/EP2012/060622 mailed Aug. 16, 2012.

International Search Report in related International Application No. PCT/EP2012/058734, mailed Aug. 6, 2012.

* cited by examiner

METHODS AND SYSTEMS FOR A GENERIC MULTI-RADIO ACCESS TECHNOLOGY

RELATED APPLICATIONS

This application is related to, and claims priority from, U.S. Provisional Patent Application Ser. No. 61/493,795, filed on Jun. 6, 2011, entitled "METHODS AND SYSTEMS FOR A FLEXIBLE DISTRIBUTED SEQUENCER", to Jerker ÖRJMARK, Michael BRESCHEL, Kent Inge INGESSON, Robert KLANG, and Magnus MALMBERG, and U.S. Provisional Patent Application Ser. No. 61/493,801 filed on Jun. 6, 2011, entitled "METHODS AND SYSTEMS FOR A RADIO PLANNER", to Jerker ÖRJMARK, Kent Inge INGESSON, and Robert KLANG, and to U.S. Provisional Patent Application Ser. No. 61/493,794, filed on Jun. 6, 2011, entitled "METHODS AND SYSTEMS FOR A GENERIC MULTI-RADIO ACCESS TECHNOLOGY LAYER ONE SOFTWARE ARCHITECTURE" to Jerker ÖRJMARK, Kent Inge INGESSON, and Robert KLANG, the disclosures of which are incorporated here by reference.

TECHNICAL FIELD

The present invention relates generally to communication devices and, more specifically, to devices associated with multiple radio access technologies.

BACKGROUND

At its inception radio telephony was designed, and used for, voice communications. As the consumer electronics industry continued to mature, and the capabilities of processors increased, more devices became available for use that allowed the wireless transfer of data between devices. Also more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found an increasing need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems were implemented in GSM with the addition of the General Packet Radio Services (GPRS). 3G systems introduced by Universal Terrestrial Radio Access (UTRA) standards made applications like surfing the web more easily accessible to millions of users (and with more tolerable delay). Thus, numerous radio access technologies (RATs), such as e.g. Wideband Code Division Multiple Access (WCDMA), OFDMA, TDMA, TD-SCDMA, and others, can be found in use today in wireless systems such as e.g. GSM/GPRS/EDGE, UMTS, UMTS-LTE, WLAN, WiFi, etc.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the years to come. This evolution of network designs has resulted in various network operators deploying their networks in various frequency bands with different RATs in various geographical areas. As a result of this, a user equipment (UE) which supports several frequency bands and/or several different RATs will need to be able to, among other things, search for cells and service in a correct frequency band and/or RAT.

The rapid development of new standards for mobile telephony and other communication technologies and the even more rapid addition of new features to the existing standards drive higher design costs for devices which use the currently existing architectures. For example, devices which enable access to a particular RAT or RATs typically have a software (SW) architecture that is tailored to that RAT(s) and its current features. When a new RAT or feature is added to a multi-RAT UE device architecture, not only the new RAT/feature has to be implemented in the architecture but also the legacy implementations have to be adapted, which process typically seriously affects the software implementation and adds significantly to the devices' costs.

This methodology for introducing a new RAT, or a new functionality to an existing RAT, makes the SW architecture of UEs complex and it becomes difficult to make the modifications that are necessary to adapt to such changes. Additionally, development is often performed at different geographical sites, sometimes located in different continents, causing the integration to be even more complicated and costly.

In addition to software architecture modifications, hardware changes may also be necessary or advisable due to RAT adaptations in UEs. For example, in a multi-RAT UE, it is often desirable to share (as much as possible) the hardware (HW) in the system. One example of potentially shareable hardware in a multi-RAT device is a HW accelerator. However, each user (i.e., RAT) of a HW accelerator needs to keep its own context to avoid unwanted coupling, i.e., dependency, with other RAT's algorithms or modules. One way to enable each user to keep its own context is to include, and use, several register pages in the HW accelerator. However, the number of pages available in the register is fixed upon design of the silicon associated with the multi-RAT UE and cannot be changed later. This makes this decoupling strategy somewhat inflexible with respect to subsequent RAT or feature additions.

Moreover, regarding algorithms used in multi-RAT devices, these algorithms can be implemented in either software (SW) or hardware (HW) and typically have a stronger coupling with each user or RAT than is desirable. This coupling or dependency can cause unwanted redesign of neighboring blocks when one block is changed in a UE (or subcomponent of the UE). Also, as the number of RATs increases, unknown dependencies and side effects can arise from other parts of the system that may be undesirable. Still further, in a multi-RAT system the higher data rates and shorter transmission time intervals (TTIs) can cause ever higher interrupt loads in systems designed with a central controller.

Still further, when adding new functionality, e.g., additional RAT capabilities, to a UE the dependencies between the different activities, such as paging channel (PCH) reception and measurements can make it cumbersome to implement, since new combinations of use cases need to be considered and then hard coded. The Layer 1 RAT software typically uses the radio for different purposes, such as channel reception and measurements. As there is no common planning between RATs in conventional multi-RAT architectures, it is difficult to handle specific use cases where the active RAT cannot handout the necessary radio time. In an attempt to avoid radio usage conflicts, each use case, such as paging channel reception with serving cell measurements, is typically combined and/or synchronized. However, conflicts cannot always be resolved, and a fair handling between RATs/functionalities may be impossible.

Moreover, when adding additional RATs to a multi-RAT architecture (compared, e.g., to having only GSM and W-CDMA architectures in a device) the complexity increases since the active RAT must decide which of a number of passive RATs should be given radio time. When adding a new RAT, the already existing RATs have to be updated to be aware of radio need particulars associated with the new RAT. If the active RAT and the passive RAT are not well aligned radio usage conflicts can occur. Detection of radio access conflicts requires specific hardware design to address the issue, e.g., potentially extensive signaling between the RAT modules related to radio access time handling which can become very complicated as the number of RATs increases. Many interrupt signals and other signals are required, which makes current solutions inefficient and prone to errors. Existing solutions for adding additional RAT capabilities to a UE are also power inefficient, e.g., due to the excessive signaling and the requirement for knowledge in each RAT module of all other RATs in the device.

Accordingly, it would be desirable to provide methods and systems which reduce or remove the above described drawbacks associated with multi-RAT devices.

SUMMARY

According to an exemplary embodiment, an arrangement for processing data includes a processor configured to execute procedures associated with different radio access technologies (RATs), a radio planner function configured to receive requests for radio resources from the procedures and further configured to selectively grant or deny radio access by the procedures in response to said requests, and a memory device configured to operate as a distributed data base to store data produced by at least one of the procedures and to provide the data to at least one other of the procedures.

According to another embodiment, a multi-RAT wireless communication device comprises the arrangement described in the foregoing paragraph.

According to another embodiment, a method for processing data in a multi-radio access technology (RAT) device includes generating procedures to perform functions associated with different radio access technologies (RATs), storing data produced by at least some of the procedures in a distributed database, retrieving the data from the distributed database for procedures which are consumers of the data, and receiving and handling, by a radio planner function, requests for radio resources from at least some of the procedures.

According to another exemplary embodiment, a non-transitory computer-readable medium containing program instructions which, when executed by a computer or processor, perform the steps of generating procedures to perform functions associated with different radio access technologies (RATs), storing data produced by at least some of the procedures in a distributed database, retrieving the data from the distributed database for procedures which are consumers of the data, and receiving and handling, by a radio planner function, requests for radio resources from at least some of the procedures.

According to another embodiment, an arrangement includes a multiple radio access technology (RAT) platform configured to enable communications with a plurality of different RATs using procedures associated with transceiver processing functions, wherein the procedures implement the transceiver processing functions through functional units (FUs) which perform operations, the FUs being implemented in at least one of hardware and software; and wherein the FUs are configured by functional unit descriptors (FUDs) which instruct an FU regarding at least one of: (a) from which memory location to fetch data to operate upon or parameters associated with an operation to be performed by the FU, (b) to which memory location to store data as a result of an operation and (c) a message type to output after the operation.

According to another embodiment, a multi-RAT wireless communication device includes the arrangement in the preceding paragraph.

According to another embodiment, a method for implementing radio communication functions in a decoupled manner includes generating procedures to perform transceiver processing functions which enable communications with a plurality of different radio access technologies (RATs), implementing the transceiver processing functions through functional units (FUs) which perform transceiver processing operations, the FUs being implemented in at least one of hardware and software, and configuring the FUs by functional unit descriptors (FUDs) which instruct an FU regarding at least one of: (a) from which memory location to fetch data to operate upon or parameters associated with an operation to be performed by the FU, (b) to which memory location to store data as a result of an operation and (c) a message type to output after performing the operation.

According to another exemplary embodiment, a non-transitory computer-readable medium containing program instructions which, when executed by a computer or processor, perform the steps of: generating procedures to perform transceiver processing functions which enable communications with a plurality of different radio access technologies (RATs); implementing the transceiver processing functions through functional units (FUs) which perform transceiver processing operations, the FUs being implemented in at least one of hardware and software; and configuring the FUs by functional unit descriptors (FUDs) which instruct an FU regarding at least one of: (a) from which memory location to fetch data to operate upon or parameters associated with an operation to be performed by the FU, (b) to which memory location to store data as a result of an operation and (c) a message type to output after performing the operation.

According to another exemplary embodiment, a method for avoiding conflicts between a plurality of radio access technology (RAT) module resource requests comprising: receiving radio time reservation requests at a radio planner function, each of which requests includes a priority value for the radio time reservation request, determining, by the radio planner function, whether to grant or deny each of the radio time reservation requests based at least in part on comparison of the priority values, and sending either a corresponding grant or a denial based upon the step of determining toward a corresponding radio time reservation requester.

According to another exemplary embodiment, a platform for allocating radio resources among a plurality of radio access technology (RAT) modules comprises radio hardware configured to transmit and receive radio signals over an air interface using the plurality of RATs, a radio planner connected to the radio hardware and configured to receive radio time reservation requests, each of which requests includes a priority value for the radio time reservation request, and to determine whether to grant or deny each of the radio time reservation requests based at least in part on the priority values.

According to another exemplary embodiment, a non-transitory computer-readable medium containing program instructions which, when executed by a computer or processor, perform the steps of: receiving radio time reservation requests at a radio planner function, each of which requests includes a priority value for the radio time reservation request; determining, by the radio planner function, whether to grant or deny each of the radio time reservation requests based at least in part on comparison of the priority values; and sending either a corresponding grant or a denial based upon the step of determining toward a corresponding radio time reservation requester.

According to an exemplary embodiment there is a software architecture for Layer-1 for accessing a radiocommunication system. The software architecture includes: a procedure configured to terminate a control plane from higher layers and configured to use a radio planner; the radio planner configured to manage and grant access to a common radio; a distributed database configured to allow decoupling of a producer and a consumer of a same data; and a functional unit configured to encapsulate a functionality. The functional unit can also include a configuration interface and an algorithm. The software architecture can also include a session configured to build chains of functional units to make up the uplink and downlink processing. The software architecture can also include a resource manager configured to collect and allocate resources to all sessions.

According to another exemplary embodiment there is a method for using a software architecture for Layer-1 for accessing a radio communication system. The method includes: terminating a control plane from higher layers and using a radio planner by a procedure; managing and granting access to a common radio by the radio planner; decoupling of a producer and a consumer of a same data by a distributed database; and encapsulating a functionality by a functional unit.

According to another embodiment, a device includes a processor configured to execute program instructions stored on a computer-readable medium, the program instructions being operable to encapsulate at least one hardware functional unit wherein the encapsulated hardware functional unit receives instructions and generates responses which are generic relative to any of a plurality of radio access technologies (RATs) which the device is capable of communicating with, and a distributed data base configured to enable producers of data and consumers of data within the device to exchange data indirectly.

According to an exemplary embodiment there is method for processing data in a multi-radio access technology (RAT) user equipment (UE). The method includes: building a logical model; providing a physical allocation to a plurality of logical objects; committing resource use; and processing data by a plurality of functional units (FUs).

According to another exemplary embodiment there is a method for processing data in a multi-radio access technology (RAT) user equipment (UE). The method includes: reading samples from a radio interface; configuring a plurality of functional unit descriptors (FUDs); associating a functional unit (FU) with each of the plurality of FUDs; transmitting at least one instruction from each of the plurality of FUDs to its associated FU; processing signals by each of the FUs based on its received at least one instruction, wherein the FUs process their received at least one instruction in a sequential order; and delivering a block of data. Additionally, each FU can be associated with a plurality of FUDs.

According to another exemplary embodiment there is a functional unit (FU) for processing an algorithm. The FU includes: an in-port section for receiving a first message; a functional unit section for processing the first message; and an out-port for transmitting a second message based on the processing of the first message.

According to another exemplary embodiment there is functional unit descriptor (FUD) for configuring a functional unit, the FUD includes: a first information associated with one or more memory locations for a functional unit (FU) to use; and a second information associated with one or more messages the FU sends after processing a message.

According to another exemplary embodiment, a multi-radio access technology (RAT) user equipment (UE) includes: a plurality of RAT modules, each of which are configured to enable the multi-RAT UE to communicate with a different RAT; and a processor configured to perform functions independent of the RAT modules by invoking corresponding functional units, wherein performance of an instance of one of the functions by a corresponding functional unit is specified by a function unit descriptor. According to an exemplary embodiment there is a method for avoiding conflicts between a plurality of radio access technology (RAT) module resource requests. The method includes: assigning a priority to a radio time reservation request; requesting the radio time reservation request including the priority; and receiving either a grant or a denial for the radio time reservation request, wherein a radio time is specified with a unified time base for a granted radio time reservation request.

According to an exemplary embodiment there is a method for avoiding conflicts between a plurality of radio access technology (RAT) module resource requests. The method includes: receiving, at a radio planner function, a radio time reservation request which includes a priority for the radio time reservation request; determining whether to grant or deny the radio time reservation request based on the priority; assigning a unified time base for the radio time reservation request if the radio time reservation request is granted; and sending either a grant or a denial based upon the step of determining whether to grant or deny the radio time reservation request.

According to another exemplary embodiment there is a device for avoiding conflicts between a plurality of radio access technology (RAT) module resource requests. The device includes: at least two RAT modules configured to request a radio time reservation and configured to assign a priority for the radio time reservation request; a processor with a radio planner function which is configured to determine whether to grant or deny the radio time reservation request based on the priority, configured to assign a unified time base for the radio time reservation request if the radio time reservation request is granted and configured to send either a grant or a denial based upon the determination whether to grant or deny the radio time reservation request.

According to another exemplary embodiment, a device includes or comprises a plurality of radio access technology (RAT) modules, each configured to enable radio communications between the device and a corresponding RAT network, and a radio planner module configured to receive a radio access request from one or more of said plurality of RAT modules and to selectively authorize each radio access request. Upon receipt of a radio access request grant signal from the radio planner module, the corresponding RAT module in the device can initiate radio access by transmitting one or more signals toward a corresponding RAT network.

BRIEF DESCRIPTION OF THE DRAWINGS

The accompanying drawings illustrate exemplary embodiments, wherein.

DETAILED DESCRIPTION

Figure 1:
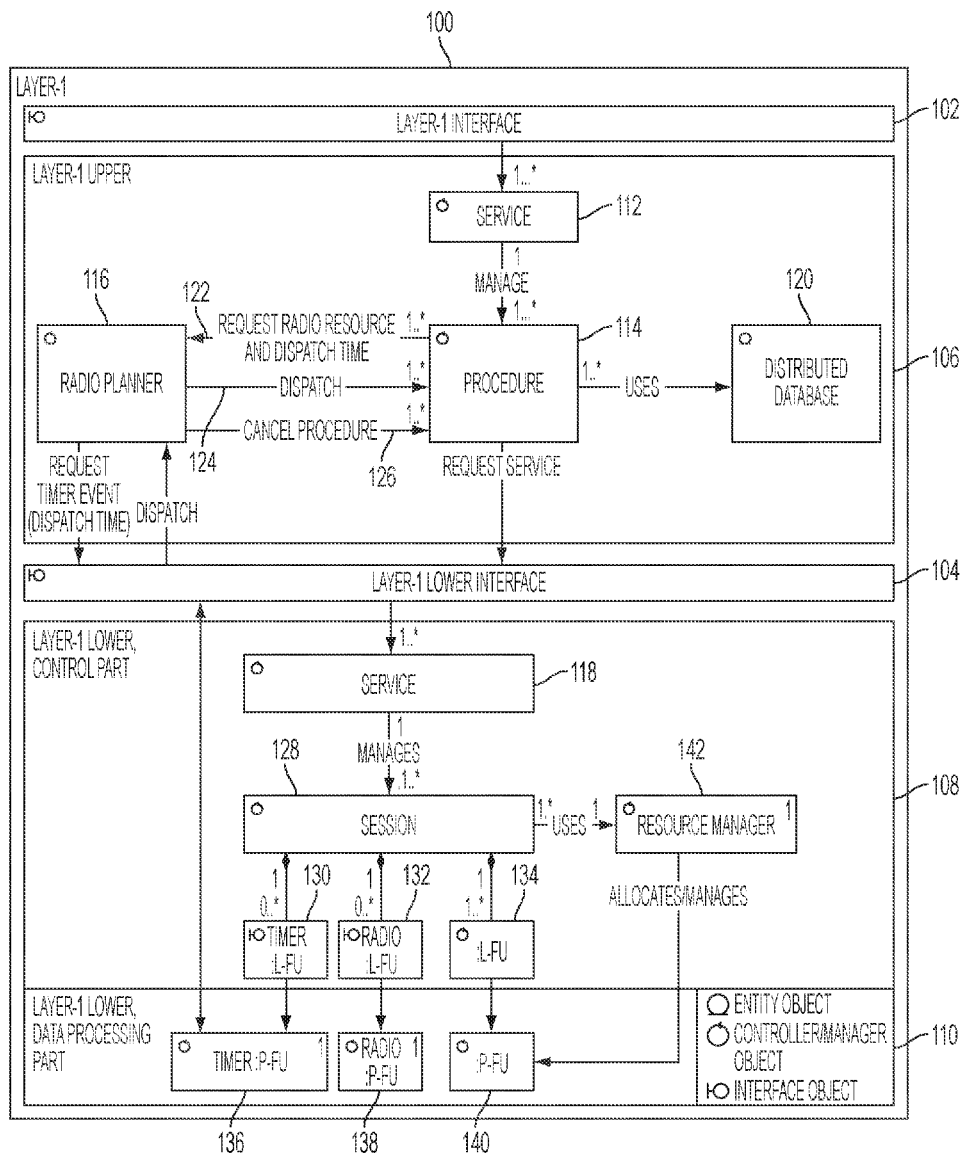
FIG. 1 illustrates a Layer-1 architecture according to an exemplary embodiment.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As mentioned above, when a new radio access technology (RAT) or feature is added to a multi-RAT user equipment (UE), not only is it the case that the new RAT/feature has to be implemented but the legacy implementations also have to be adapted, which typically seriously affects both the software and hardware implementation. Typically, and for example, a dual or multi-RAT layer 1 (L1) software (SW) may be implemented as a union of the relevant RATs with very little use of common functionality, separate interfaces and only a simple interface between the RATs. Problems associated with such an approach have been mentioned above.

According to exemplary embodiments, there is provided a Layer-1 structure that is non-radio access technology (RAT)-centric, a software (SW) and/or hardware architecture for Layer-1 that is non-RAT-centric and which allows for strong separation of features that are not naturally coupled by the relevant radio communication standards, e.g., 3GPP standards. This can be accomplished by, for example, identifying architectural elements, e.g., interfaces, services, procedures, sessions and functional units (FUs), that may be instantiated and specialized to implement any access technology or feature. Common entities, e.g., a radio planner, a resource manager, a radio-FU and a timer-FU described below, can provide non RAT-centric services to all features. Furthermore, means are provided in the embodiments described herein which allow the features to exchange information without creating strong couplings between them by using, for example, a distributed database.

According to exemplary embodiments, the generic multi-RAT architecture can also allow for distribution of the architectural elements, e.g., interfaces and FU message protocol(s), over one or several central processing units (CPUs)/cores. The architecture can also enable moving of functionality, e.g., FUs, between CPUs, digital signal processors (DSPs) and hardware (HW) accelerators as well as supporting HW changes. A set of rules can be defined for how to implement the application code (in the services, procedures, sessions and FUs) and a set of user interfaces can also be defined for how to use the common entities. According to exemplary embodiments, when these rules are followed and the user interfaces are used, little or no unwanted coupling between features/RATs is expected to be introduced and new features/RATs may be added without affecting legacy implementation. Similarly, features may be removed to create low cost variants from the existing code base without affecting the remaining features.

General Software Architecture

According to exemplary embodiments a generic multi-RAT structure (which includes a software architecture for performing the tasks and functions described below) in which exemplary embodiments described herein can be implemented, is now described with respect to FIG. 1. Some of this description makes usage of object-oriented programming terms to explain various features, without necessarily implying that those features are implemented using object-oriented programming techniques. FIG. 1 may, for example, be seen as a top level class diagram (e.g. for ePHY). Therein, interfaces provide the user (e.g., one of the RATs) of the service with a function-oriented application program interface (API) that hides the actual deployment and implementation of the service. For example, Layer-1 100 includes a number of interfaces which can act as a proxy for a server, e.g., the external Layer-1 interface 102 and the internal Layer-1 Lower interface 104 can act as a proxy for the server. According to this exemplary embodiment, the Layer-1 architecture is divided into an Upper Layer-1 106 and a Lower Layer-1 including a control part 108 (e.g. implemented in an ARM processor) and a data processing part 110 (e.g. implemented as HW accelerators, or in CPU/DSP), the Lower Layer-1 being more dependent upon the underlying hardware (in some cases typically baseband HW). Each of these different architectural components, and the manner in which their sub-elements cooperate to facilitate generic multi-RAT operations, will now be discussed in more detail.

The Upper Layer-1 106 includes a service class which captures each service 112 and its parameterization as requested by the user, e.g., one of the multiple RATs supported by the Layer-1 architecture 100. Note that although only a single service 112 is illustrated in FIG. 1, that the Upper Layer-1 component 106 may, at any given time, have numerous service instantiations 112 of the service class based upon user requests as indicated by the reference 1 . . . *. The services 112 provide a first step/mechanism for separating (decoupling) the features being implemented in the generic multi-RAT architecture from each other.

Service object(s) 112 receive requests from the users (RATs) via Layer-1 interface 102 and operate on those requests to determine what functionality is being requested (as distinguished from how to implement the requested functionality). Based on this functionality determination, the service object(s) 112 instantiate one or more procedures or procedure objects 114, which operate to implement the requested functionality. A procedure or procedure object 114, in this context, can be considered to be a logical state machine which implements a desired functionality, e.g., channel measurements, either for a particular RAT or in a manner common to multiple RATs. The procedure(s) 114 can also operate to terminate the control plane from higher layers and implement the external behavior (in the control plane). The procedure class can be instantiated and specialized for each function provided by the Layer-1 architecture 100. Each procedure 114, or group of coupled procedures 114, plan and setup the execution of their associated function independently of the rest of the system, i.e., without the knowledge, handshaking or participation of other procedures 114. This independent characteristic of the procedures 114 according to these embodiments avoids the need to re-write or otherwise modify procedures 114 when new features and/or new RATs are added to the architecture.

Several common elements, i.e., shared by the various procedures 114 regardless of which RAT's requests instantiated those procedures, are provided to the Layer-1 architecture 100 to enable the independence of the procedures 114. For example, the radio planner 116 is used by procedures 114 to obtain radio time allocation, i.e., to share the physical radio transceiver between different RATs and among different procedures associated with the same RAT.

According to exemplary embodiments, the radio planner 116 can allow the independent procedures 114 to co-exist in a single radio environment. The radio planner 116 manages, and grants access to, the common radio through interactions with the Layer 1 Lower portions 108, 110. Before the radio may be used by a procedure 114, the procedure will request an allocation (e.g., a radio resource and dispatch time) from the radio planner 116, e.g., as indicated by signal line 122. Radio booking can be performed by the radio planner 116 based on, among other things, relative priority of the radio resource requests. According to some embodiments, the procedure 114 must receive a radio grant via dispatch signal line 124 in order to access the radio. Moreover, it is the responsibility of the client (i.e., procedure 114) to take subsequent action(s) if the request for radio usage is rejected, e.g., via signal line 126. Radio time can be booked in a generic, non-RAT specific, time format. A more detailed discussion of the radio planner 116 is provided below under the header "Radio Planner".

In addition to the radio planner, procedures 114 can also use the services 118 in the Layer-1 lower interface 108 to make the procedures 114 hardware independent. Note, however, that between procedures 114 that are not strongly coupled there may still exist a client-server relation, i.e., there can be a one way relationship or coupling between two procedures as between a client and a server. To allow the server part to produce data without being aware of the consumer of the data, exemplary embodiments also provide for a distributed database 120. The distributed database 120 allows for decoupling of the producer and consumer of a same data (this can be an implementation of a thread safe observer pattern) by providing a common storage area in which data can be stored by various procedures 114 and from which data can be retrieved by various procedures 114. In this way, the producer of data need not know the number or identity of the consumers of that data. For example, if a particular procedure 114 were instantiated to read and identify cells in a neighbor list, that procedure 114 could store the resulting data in the database 120 and other procedures 114 (e.g., measurement procedures) can obtain this data from the database without any direct interaction between the neighbor list reading procedure 114 and the measurement procedures 114.

Moving now to the Layer-1 Lower portion in FIG. 1, an interface 104 is provided to, for example, enable deployment of the clients on different processors, and the interface 104 also transfers request from the Layer-1 Upper portion 106 of the architecture 100 to the control 108 and data 110 portions of the Layer-1 Lower portion of the architecture 100. In a manner similar to that associated with the Layer-1 Upper 106, a service object 118 can be instantiated in response to receipt of a request for a lower layer service from the interface 104, e.g., the service instantiation indicating the function requested to be performed rather than the mechanism for performing that function. According to exemplary embodiments, sessions 128 implement the functionality provided by the Layer-1 lower services in response to requests from the procedures 114 and/or the radio planner 116. The sessions 128 may, for example, be the first entity in the architecture 100 where hardware awareness begins but these sessions 128 also employ logical configuration interfaces for the functional units (FUs, described below), e.g., logical FUs 130, 132 and 134, that hide both implementation and deployment of the actual algorithms. Sessions 128 can build chains of FUs to make up the complete uplink and downlink processing and provide services to the requests associated with instantiated service objects 118. Like many other objects in the architecture 100, sessions 128 that are not directly dependent on each other may not be aware of each other at all.

According to exemplary embodiments, an FU, as represented for example by the logical FU 134 and the corresponding physical FU 140, can be an encapsulation of a well-defined functionality, e.g., a Fast Fourier Transform (FFT), which can be used to perform an operation as part of a (potentially more complex) radio function being executed by a procedure 114. The FU can be a distributed object which contains a configuration interface part, e.g., logical FU 134, that provides a function oriented interface to the user and an algorithm part, e.g., physical FU 140, which executes the functionality. The algorithm part 140 may be implemented in HW or SW and its deployment can be opaque to the user, i.e., the RAT or procedure 114 which ultimately called the algorithm. The configuration interface 134 may be instantiated several times by different users, independently of each other, sharing the same algorithm implementation. The instances can be connected in self-triggering chains that allow autonomous execution without intervention of any central CPU at configuration time (sessions). The actual deployment and implementation of the algorithm part 140 can also be resolved at configuration time without the triggering FU and triggered FU ever being aware of the other FUs deployment and implementation. To allow a mix of FUs 134, 140 implemented as HW accelerators or algorithms executing on different microcontrollers or DSPs, a special protocol associated with FU descriptors (FUDs, described in more detail below) may be used. While normally adapted depending on whether an FU is implemented in HW or SW, the FUD could be defined in a way that is usable both for HW and SW. The L-FU 134 is used to construct the FUD in its role of configuration, and is also able to send a message to the P-FU 140. The session 128 uses this message to start the signal processing chain of P-FUs 140. The session 128 sends a message to the first P-FU 140 in the chain, then the P-FUs 140 will trigger each other without any involvement of the session 128 or L-FUs 134. More information about FUs and FUDs is provided below under the header "Functional Units".

According to exemplary embodiments, various specialized FUs can be provided to the architecture 100. For example, a Radio-FU 138 is a specialization of the FU class. The Radio-FU 138 can encapsulate the common radio HW. As with the general FU 140, the users (sessions 128) all create their own instance of the corresponding configuration interface 132 independently of each other. A Timer-FU 136 is also a specialization of the FU class. The Timer-FU 136 can encapsulate the common timer HW and provide timer functionality to both the common, e.g., radio planner 116, and the RAT specific, e.g., procedures 114, parts. Timer requests can be booked in a generic, non-RAT specific, time format. More details regarding FUs are provided below under the heading "Functional Units (FUs)."

Figure 2:
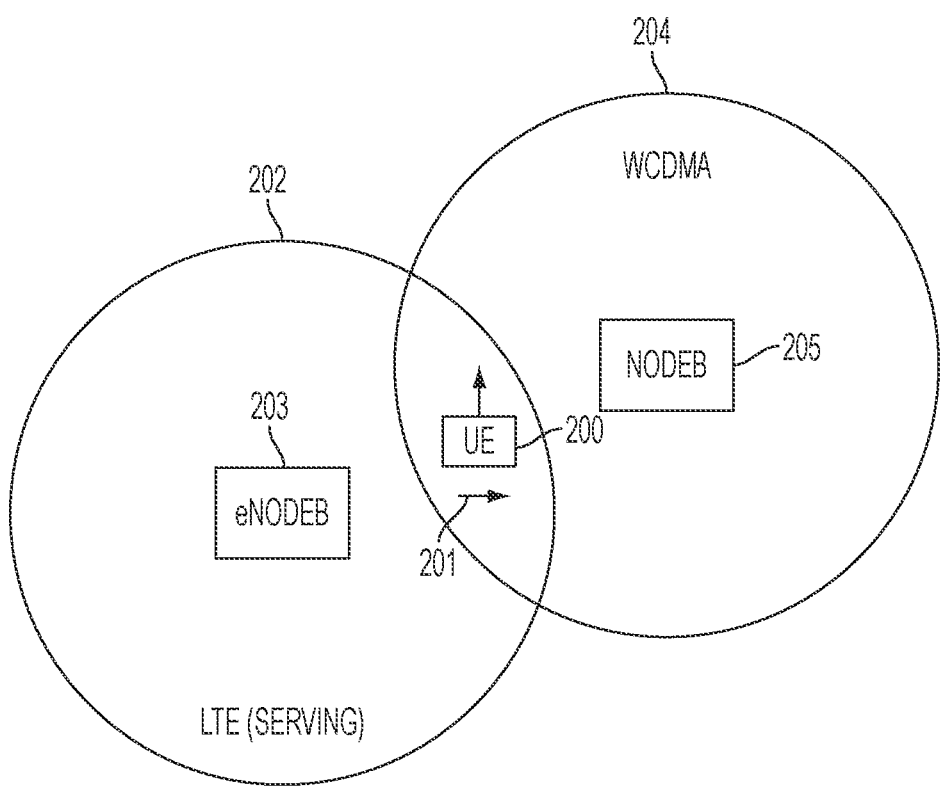
FIG. 2 depicts an exemplary usage case used to describe operation of the Layer-1 architecture of FIG. 1.

According to exemplary embodiments, the architecture 100 can allow completely decoupled functions (sessions 128) to share the same hardware and software resources. In a manner analogous to that of radio planner 116, the common resource manager 142 may collect and allocate resources, e.g., memory, HW, DSP bandwidth, etc., to all functions (sessions 128), e.g., by downloading software, allocating memory space, initializes memory space, power-up hardware, power-down hardware, etc., such that several users (sessions 128) can share these resources without handshaking between the sessions 128 themselves. Thus, an un-awareness between RATs is achieved. According to embodiments, there is no direct communication between RAT modules or between services/procedures/sessions which are related to different RATs. Thus, the RATs function autonomously from each other and do not require handshaking Example of Architecture Operation According to exemplary embodiments, the Layer-1 software architecture 100 described above can be used in UEs to allow a plurality of RATs, e.g., a Long Term Evolution (LTE) network, and a Wideband Code Division Multiple Access (WCDMA) network, to cooperatively access various UE resources. To better understand how the architecture 100 can operate, in particular with respect to its capability to decouple RAT functions, consider the following exemplary radio operation starting with FIG. 2.

Figure 3:
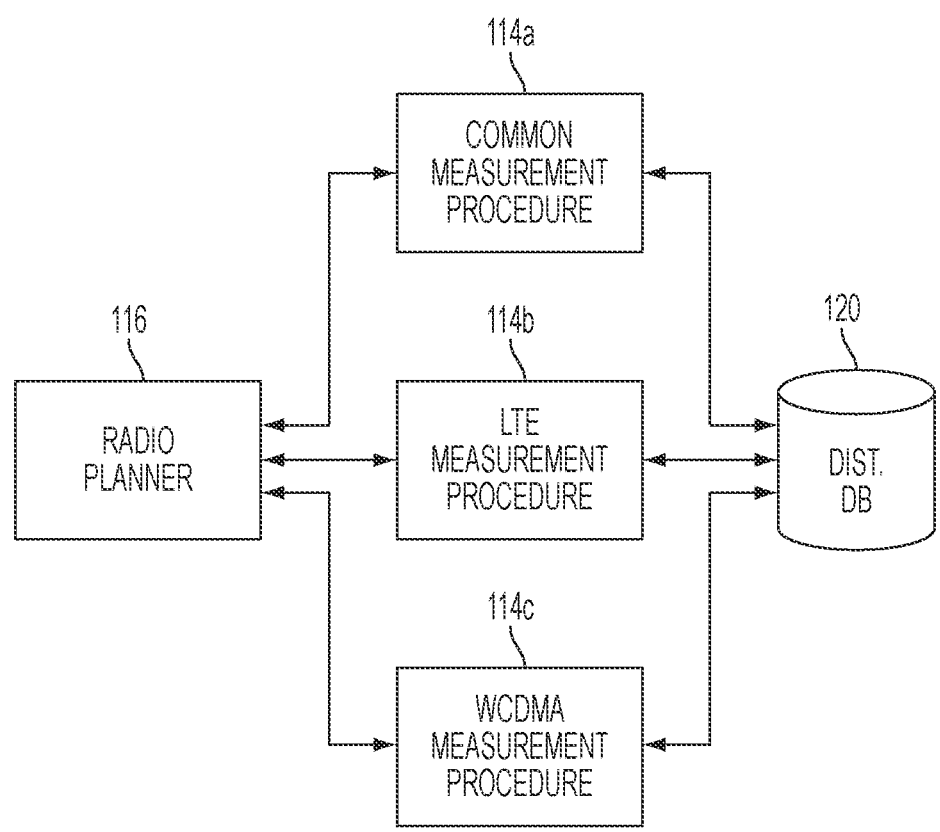
FIG. 3 shows various procedures generated as part of the exemplary usage case of FIG. 2.

Therein, suppose that a LTE/WCDMA multi-RAT UE 200 operating with the architecture 100 described above, is moving in the direction of arrow 201. The UE 200 is currently served by LTE cell 202 (eNodeB 203), however the signal strength from the serving cell is weakening as the UE 200 moves toward the cell border. Accordingly, it is desirable for the UE 200 to begin making preparations for a possible handover to WCDMA cell 204 (Node B 205). Thus, the Layer-1 interface 102 receives requests from the LTE and WCDMA clients to measure the relevant LTE channel(s) and WCDMA channel(s), including parameters associated with those channels and the desired measurements. These requests result in the instantiation of a measurement service object 112, which reflects the clients' desire to perform measurements. The measurement service object 112, in turn, uses the received parameters to generate a plurality of procedures 114, e.g., a common measurement procedure 114a, an LTE measurement procedure 114b and a WCDMA measurement procedure 114c, which govern how the measurements will be performed, as illustrated in FIG. 3.

According to this embodiment, the common measurement procedure 114a performs measurement task(s) which are common to a plurality of RATs (e.g., associated with a paging channel), in this example, LTE and WCDMA, while the RAT-specific measurement procedures 114b and 114c perform measurement tasks which are specific to those RATs. Since, in this purely illustrative example, the serving cell 202 is an LTE cell, the LTE measurement procedure 114b dictates when measurements can be performed. Thus, the LTE measurement procedure 114b publishes information (stored in the distributed database 120) regarding when measurements may be performed. Note, however, that while the LTE measurement procedure 114b is the producer of this "measurement availability" data, the LTE measurement procedure 114b according to this embodiment has no knowledge of the existence of the common measurement procedure 114a or WCDMA measurement procedure 114c, or their need for the measurement availability data. In fact, there could be any number of other additional RAT measurement procedures operating in parallel with the LTE measurement procedure 114b without any need to modify the LTE measurement procedure 114b.

The other measurement procedures 114a and 114c subscribe to receive information regarding measurement availability. Thus when the procedure 114b in this example places information in the database 120 regarding where/when it is acceptable to perform signal strength/quality measurements, the procedures 114a and 114c are notified. The measurement procedures 114a-c will then use the measurement availability data to request radio time for performing their needed measurements. However, since they are unaware of each other they may request usage of the radio at the same time, e.g., via radio resource requests sent to the radio planner 116. According to this embodiment, therefore, the measurement procedures 114a-114c send, along with each of their requests for radio resources, a priority level associated with the request. The priority level selected by a respective procedure 114a-114c can, for example, be based on how urgently that procedure needs to make a measurement, e.g., based on a respective standardized measurement requirement. More information related to priorities and resource arbitration performed by the radio planner 116 is provided below.

The radio planner 116 receives the requests from the various measurement procedures 114a-114c and determines which request(s) to grant and which request(s) to deny, e.g., based in part on the provided priority levels associated with the requests. The radio planner 116 then notifies each of the requesting procedures 114a-114c of its decision so that the procedures can take appropriate action, e.g., to request a measurement service 118 from the Layer 1-Lower portion 108 if its request has been granted or to await another measurement opportunity upon notification from the distributed database 120 if its request has been denied.

Considering now the Layer-1 Lower portion of the architecture 100 in this context, it will be apparent from the foregoing discussion that while the Layer-1 Upper portion 106 operates to share the radio resources among the various RATs in an uncoupled, independent way, the Layer-1 Lower portion of the architecture operates to share a number of other types of resources, e.g., hardware accelerators, memory, power, processor (DSP) bandwidth, etc., as part of performing, e.g., measurement functions. For example, upon receipt of a request from the LTE measurement procedure 114b to measure an LTE channel, a service object 118 is instantiated to perform this measurement with a certain set of parameters, e.g., how many correlations to perform to make the measurement. The service object 118, in turn, establishes one or more sessions 128 to, for example, perform the correlations using one or more chained logical FU/physical FU pairs 134, 140.

In this context, the resource manager 142 operates to coordinate resources that will be used by the physical FUs 140, e.g., to perform the correlations, avoid memory overwriting, etc. Thus, in this example, the session 128 requests resources to perform its functions, e.g., loading of DSP algorithms such as FFT, memory location(s), etc., for storage of output data (correlation results).

Figure 4:
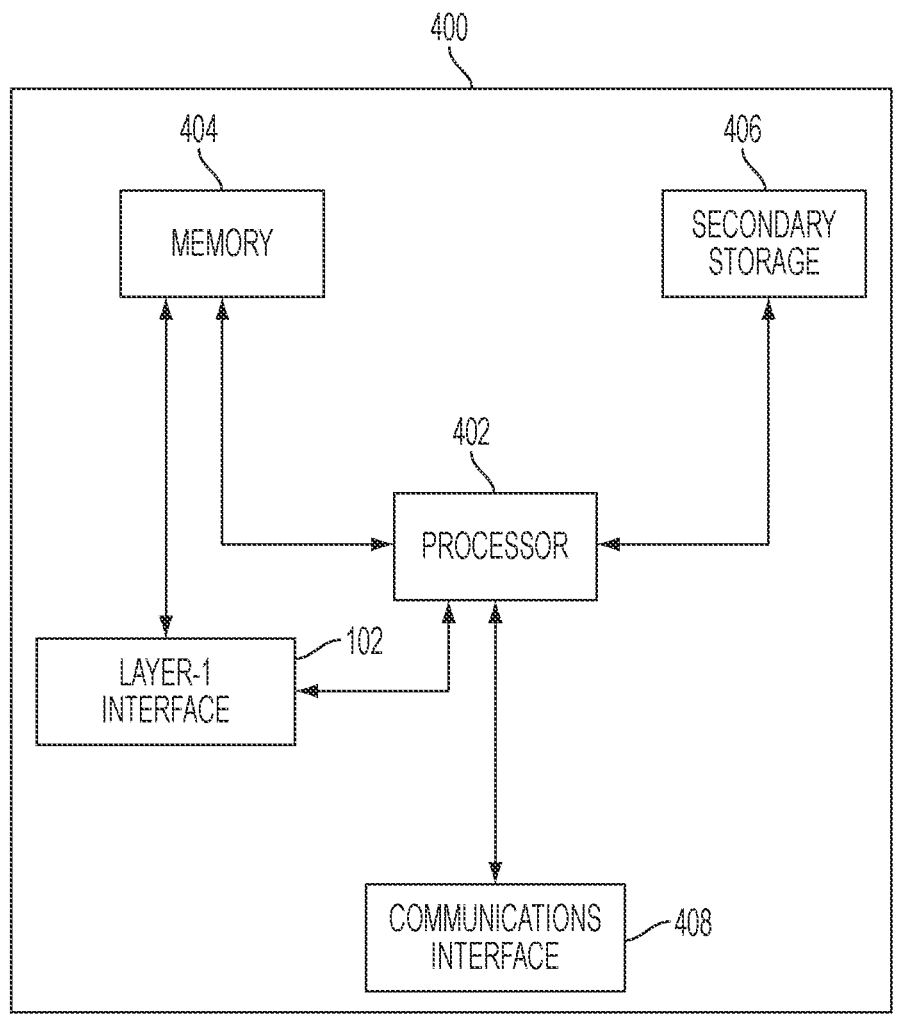
FIG. 4 depicts a device according to an exemplary embodiment.

The exemplary embodiments described above provide, among other things, for a software architecture for Layer-1 which is not RAT-centric which enables sharing of various hardware and other resources in an easily extensible manner. An exemplary (and highly generalized) device, e.g., a UE 200, will now be described with respect to FIG. 4 including hardware which can use the software architecture associated with the Layer-1 structure 100. Therein, the device 400 can contain a processor 402 (or multiple processor cores), memory 404, one or more secondary storage devices 406, an interface unit 408 to facilitate communications between the device 400 and various RATs and/or frequency bands, and the Layer-1 interface 102. It will be appreciated by those skilled in the art that other (higher) Layers will also be present and operating on the device 400.

The processor 402 generally controls the various components of the device 400. For example, the processor 402 can execute instructions to facilitate the exemplary embodiments described herein. The interface unit 408 can include one or more transceivers (e.g. radio HW) configured to send and receive signals over various air interfaces associated with different RATs and/or frequency bands. It should be noted that there may also be other units and/or connections not shown in FIG. 4, e.g. various other HW blocks or functions (e.g. a timer HW), a direct connection (or encapsulation) between blocks 102 and 408, etc.

Figure 5:
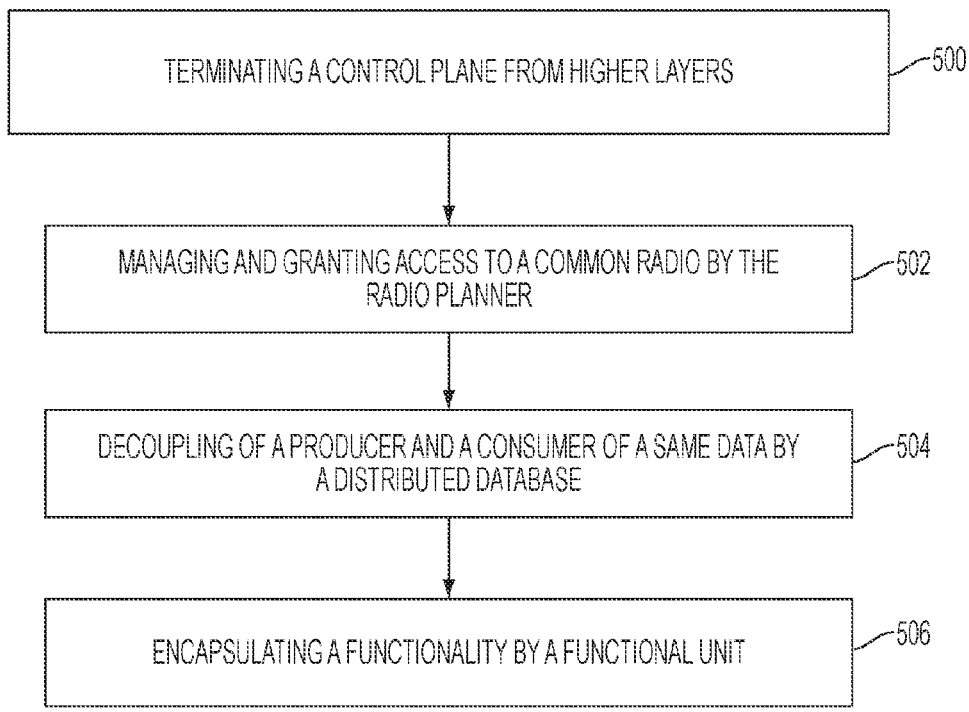
FIG. 5 is a flowchart illustrating a method according to an exemplary embodiment.

An exemplary method associated with the operation of a Layer-1 software architecture 100 is illustrated in FIG. 5. Therein, at step 500, the Layer-1 software architecture terminates a control plane from higher layers (e.g., Layers 2/3); at step 502, the Layer-1 software architecture manages and grants access to a common radio by a radio planner; at step 504 the Layer-1 software architecture decouples a producer and a consumer of a same data using a distributed database; and at step 506 the Layer-1 software architecture encapsulates a functionality by a functional unit. It should be noted that the steps in FIG. 5 may be executed in another order or even in parallel in some embodiments of the invention.

According to an embodiment, and based on the discussion above, an arrangement for processing data includes a processor configured to execute procedures associated with different radio access technologies (RATs); a radio planner function configured to receive requests for radio resources from said procedures and further configured to selectively grant or deny radio access by the procedures in response to the requests, and a memory device configured to operate as a distributed data base to store data produced by at least one of the procedures and to provide the data to at least one other of the procedures.

Figure 6:
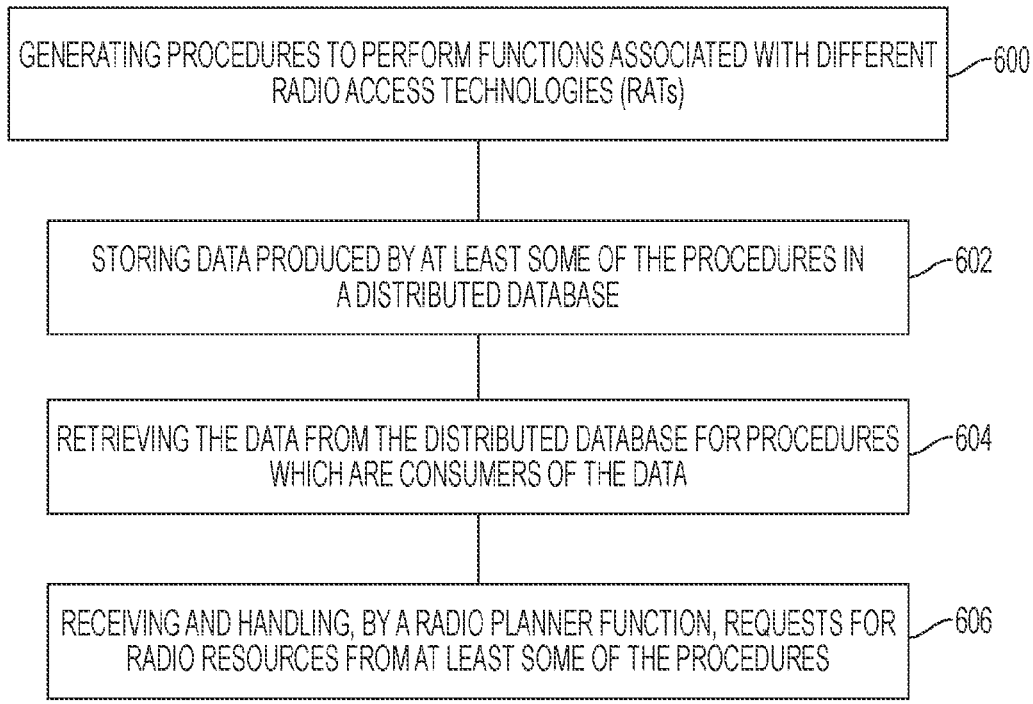
FIG. 6 is a flowchart depicting a method according to another exemplary embodiment.

According to another embodiment, a method for processing data in a multi-radio access technology (RAT) device includes the steps illustrated in FIG. 6. Therein, at step 600, procedures are generated to perform functions associated with different radio access technologies (RATs). At least some of the procedures produce data, which can be stored in a distributed database (step 602) and subsequently retrieved from the distributed database (step 604) by procedures which are consumers of that data, i.e., so as to decouple the data producing and consuming procedures. A radio planner function receives and handles requests for radio resources as indicated by step 606.

Functional Units (FUs)

As described above, exemplary embodiments described herein provide methods and systems which allow for, among other things, modularization, distributed autonomous processing without central processing unit (CPU) intervention (resulting in decreased interrupt rate) and the possibility to share hardware (HW) between an arbitrary number of users without creating any coupling between the users, e.g., radio access technology (RAT) modules. Such modularization can, among other things, be the result of encapsulating the processing into independent functional units (FUs), which were briefly described above with respect to FIG. 1. Module based architectures are easy to analyze and design, and can become more robust with respect to change. Modularization, as the term is used herein, can allow for no direct connections between the modules, e.g., RAT modules, to exist.

Thus FUs according to these embodiments can each represent well-defined functions, for example, a Fast Fourier Transform (FFT) algorithm. An FU can be realized in SW, HW or a combination thereof. The FU has no knowledge or dependency to other FUs and can be modeled as a completely stand-alone entity. Note that although this discussion regarding FUs may be applicable to FUs operating in the general Layer 1 software architecture described above, that such FUs may also be used in other architectures as desired.

Figure 7:
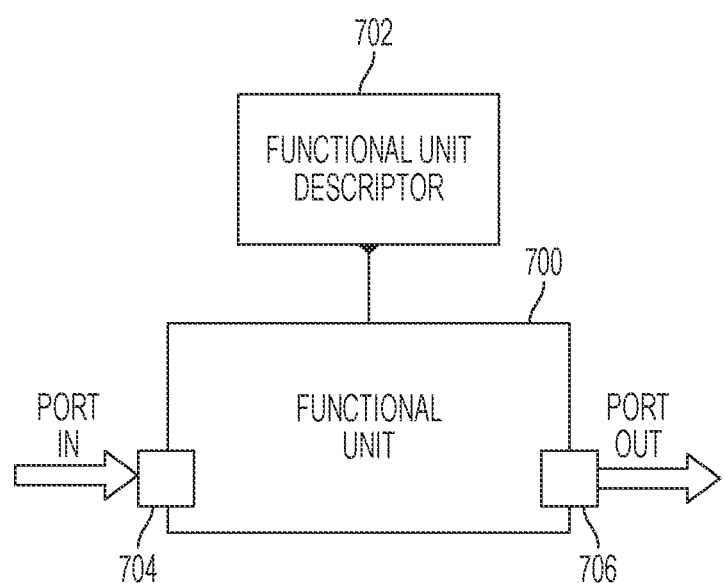
FIG. 7 illustrates a functional unit (FU) and a function unit descriptor (FUD) which may configure the FU according to an exemplary embodiment.

An FU 700, e.g., an L-FU 134 and a P-FU 140 from FIG. 1, and an associated functional unit descriptor (FUD) 702 will now be described with respect to FIG. 7. Each FU 700 can have two ports, one IN-port 704 and one OUT-port 706. The FU 700 can use the FUD 702 as one or more parameters for the FU 700's corresponding function, e.g., performing FFT(s). From the FUD 702, the FU 700 also can obtain references, e.g., associated with locations for fetching and storing data (e.g., in a memory or register). To draw an analogy between the modularization proposed in these embodiments and object oriented programming, one can consider the FU 700 to represent a class, and when the FU 700 is configured with an FUD 702, it becomes analogous to an instantiated FU object.

According to exemplary embodiments, the message which the FU 700 receives on the IN-port 704 specifies the FUD 702's location in memory. The FUD 702 can specify either or both (1) how the function can be executed and (2) what messages to send on the OUT-port 706 at completion of execution by the FU 700. Thus, the FU 700 concept describes the abstract port usage as a combination of message passing and memory sharing architecture. The FUD 702 contains immediate parameter values or references to memory where more data may be located. For example, FUD 702 can specify the location of both input and output data buffers, and it specifies what messages to send when execution has completed.

Each message received by the FU 700 may specify a different FUD 702 with a different set of parameter values and a new context. According to an embodiment, no context is typically kept in the FU 700 between the invocations. Moreover, according to embodiments, the FU 700 has no knowledge or dependency to other FUs 700 and can be modeled as a completely stand-alone entity. By using the IN-port 704, OUT-port 706, and the FUD 702 parameters it is possible to configure the FU 700 for taking part in several concurrent processing chains, i.e., as established by sessions 128 discussed above. The FU 700 can remain unaware of its context and may only react when receiving a message.

According to exemplary embodiments, a typical digital baseband scenario using the afore-described architecture can start with reading samples from a radio interface and can end with delivering a block of data to higher layers. The signal processing can be performed in several steps by different units, e.g., a plurality of chained FUs 700. Each FU 700 can be configured to send one or several messages on its OUT-port 706 when the FU 700 completes its function. The out message destination address is specified by the FUD 702 and given to the FU 700. The ports connect the FUs and drive the signal processing chain until completion, one FU starting the next as shown in FIG. 8.

Figure 8:
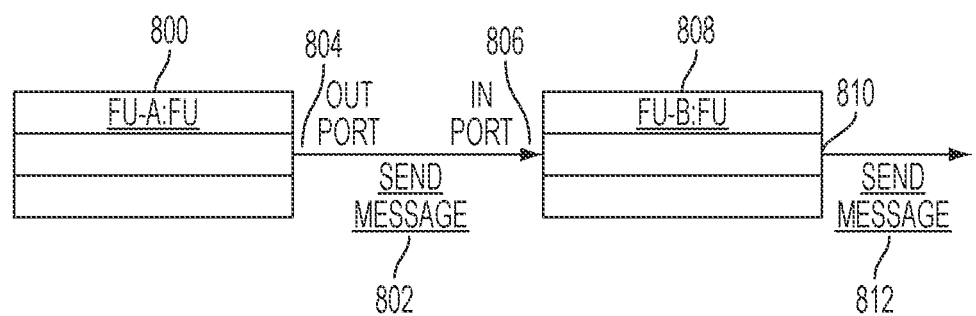
FIG. 8 shows a chain of FUs according to an exemplary embodiment.

FIG. 8 shows a first functional unit, FU-A 800 which sends a message 802 via its out-port 804. The message 802 is received by the in-port 806 of the second functional unit, FU-B 808. FU-B 808 executes the received instructions in message 802 and then sends another message 812, based upon the results of the execution of the received instructions in message 802, via its out-port 810. Thus, the ports may be used for FU-A 800 to start FU-B 808.

According to exemplary embodiments, and as mentioned above, a purpose of the FUD 702 is to specify function parameters, to specify where the FU 700 fetches its input data, to specify where the FU 700 stores its output data, and what messages the FU 700 is to send (on the OUT-port 710) when the processing is completed. An example of this can be seen in FIG. 9, where there are two FU instances: FU-A 900 and FU-B 902. In this example, both FU-A 900 and FU-B 902 have their own unique FUD, e.g., FU-A:FUD 904 and FU-B:FUD 906, respectively. In this example FU-A:FUD 904 specifies where in memory 908 to store the computational values from FU-A 900's operation and what message FU-A 900 is to send at execution completion. FU-B:FUD 906 specifies for FU-B 902 where in memory 908 to read the input for its computation. By following this exemplary scheme, the data from FU-A 900 can be supplied to FU-B 902 (e.g. via memory 908) without either FU-A 900 and FU-B 902 being aware of the other's existence. Moreover, it will be appreciated by those skilled in the art that, according to at least some embodiments, two FUs can exchange messages with each other without being "next" to each other, i.e., serial FUs in a chain. In other words the embodiments can include a mechanism that allows all FUs to send messages to all FUs independent of where the FUs are located and whether an FU is implemented as HW, SW or a combination thereof.

Figure 9:
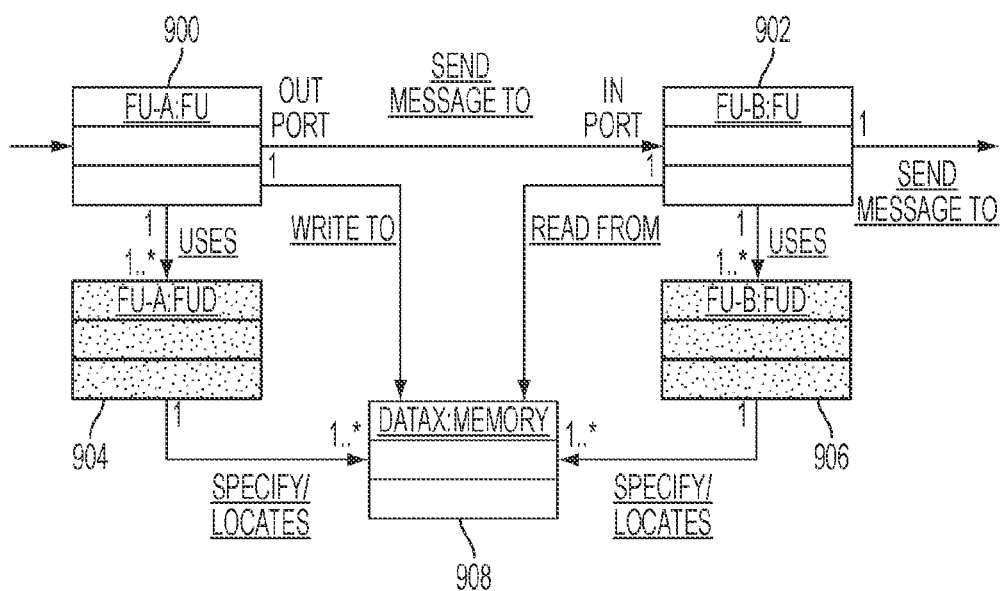
FIG. 9 shows a chain of FUs with two FUDs according to an exemplary embodiment.

According to exemplary embodiments, by using the concept illustrated in FIG. 9, one can easily remove FU-B 902 and replace it with another functional unit FU-C (not shown), without requiring changes in FU-A 900 and only minor changes in FU-A:FUD 904. Moreover, if FU-A 900 were also to be included in another context (for example, in parallel with the current context), triggering another FU-A 900, this could be accomplished by adding a FUD specifying this new context.

From the foregoing, it will be appreciated by those skilled in the art that a FU class can be instantiated any number of times, each instance with its own FUD 702 describing a specific way to execute the FU 700's function. The in-port message which a FU 700 receives can specify what FUD 702 to use. According to exemplary embodiments, the FUD 702 is the mechanism used to connect two or more FUs 700 together and customize the FUs' functions.

According to exemplary embodiments, the FU 700 can be implemented as a distributed object. The FU 700 can contain a configuration interface part, e.g., logical FU 134 in FIG. 1, that provides a function oriented interface to the user and an algorithm part, e.g., physical FU 140 in FIG. 1, that executes the functionality. The algorithm part may be implemented in HW or SW, and the algorithm's deployment can be opaque to the user. The configuration interface part may be instantiated several times by different users sharing the same algorithm instance. The configuration interface can hide the actual deployment and implementation of the algorithm part. The FUs 700 can be connected in self-triggering chains using the configuration interface, i.e., each instance creates its own context with its own FUD 702. An example of such a control plane related structure will be described later in relation to FIG. 11.

Figure 10:
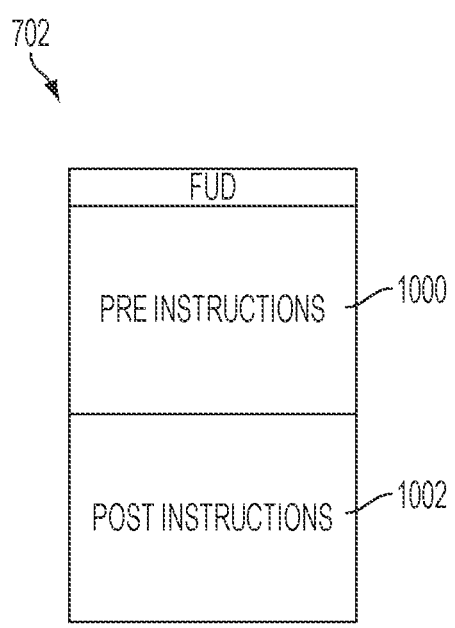
FIG. 10 shows a FUD according to an exemplary embodiment.

According to exemplary embodiments, FUs 700 can communicate with messages and shared memory buffers. The message that the FU 700 receives on its IN-port 704 can be a job mail. This message does not need to contain any data. Instead, it may comprise some form of a pointer to the FUD 702. The FUD 702 can be considered to be a stream of instructions. Logically, the instruction stream of the FUD 702 can be divided into two parts, pre-instructions 1000 and post-instructions 1002 as shown in the example FUD structure of FIG. 10. The pre-instructions 1000 can be located in the entry area of the FUD 702. These can include set-up instructions to the FU 700. The pre-instructions 1000 can be executed before the FU 700 performs its function and the post-instructions 1002 can be executed after the FU 700 has completed its function.

According to exemplary embodiments, a post-instruction can be to write register values to specified memory addresses or to send a specified message to the next FU 700 in the chain by placing a message on a port. Hence each FU 700 can be configured to send message(s) on its OUT-port 706 when it completes its function, which message(s) include the "address(es)" toward the next FU. The ports thus connect the FUs 700 and can drive the signal processing chain until completion, with one FU 700 starting the next FU 700. Again, it should be appreciated by those skilled in the art that the foregoing is not intended to imply that there is necessarily a fixed ordering of the FUs, which can instead be executed in any desired order according to the sessions.

According to exemplary embodiments, the instructions in the entry and exit area of a FUD 702 can consist of an action and a value or value pair. The actions can be different for different types of FUs 700, but according to an embodiment there can be four main groups: (1) commands for configuring the FU 700 with parameters, input data and a command to start the FU 700; (2) commands for generating output data from the FU 700; (3) commands for sending messages to other FUs 700; and (4) commands for sending trace messages to the trace and debug block. The value or value pair associated with an action can, for example, be a value or values which indicate a memory address for a buffer or a length of a transport block for a decoder.

According to exemplary embodiments, an L-FU (logical FU), e.g., L-FU 134, can be involved in the configuration and the L-FU 134 can also serve as a proxy for the P-FU (physical FU), e.g., P-FU 140. In this latter context, the session orders the L-FU 134 to pass a message to the P-FU 140. This trigger starts the execution where one P-FU 140 will trigger the next P-FU. Thus, configuration flows in the vertical plane from session via the L-FU to the P-FUD/P-FU and data flows in the horizontal plane between P-FUs.

Figure 11:
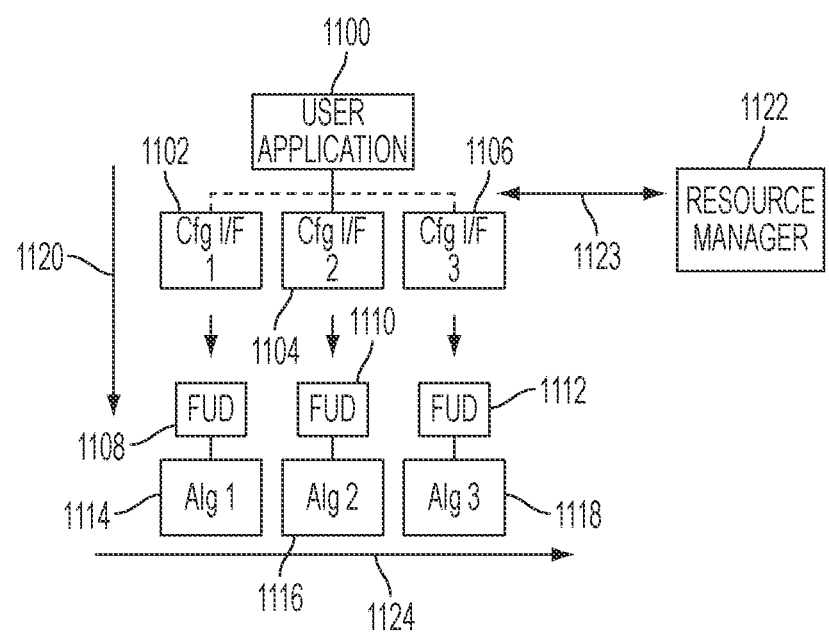
FIG. 11 shows an information flow according to an exemplary embodiment.

According to exemplary embodiments, the configuration and data flows associated with these L-FUs 134 can occur as shown in FIG. 11. Initially, there is a user application 1100 which communicates with one or more configuration interfaces 1102, 1104 and 1106, which represent the configuration aspects of various L-FUs 134. Each configuration interface 1102, 1104 and 1106 can send configuration information to a respective FUD 1108, 1110 and 1112. Each FUD 1108, 1110 and 1112 then sends instructions, or otherwise provides setup information corresponding to the configuration information to an FU, which results in the P-FUs 140 executing their instructions as represented by the algorithms 1114, 1116 and 1118 which are executed sequentially. FIG. 11 also shows various flows of information and steps associated with the elements described above. For example, configuration information can flow from the top to bottom as shown by arrow 1120 and as exemplified above, allocation of resources can occur between a resource manager 1122 (also discussed above as element 142 in FIG. 1) and the various configuration interfaces 1102, 1104 and 1106 as shown by arrow 1123. Data flow, e.g., the execution of the FUs, can occur in a horizontal direction as shown by arrow 1124. It will be appreciated by those skilled in the art that relative directional terms such as "vertical" and "horizontal" in the preceding discussion are primarily used to orient the reader relative to the example provided in the illustration of FIG. 11 and that in an actual implementation of such embodiments, the information flows are defined by various paths which may or may not be properly characterized using directional or even geometrical terminology.

According to exemplary embodiments, and to correlate the above-description of FUs and FUDs with their introduction in FIG. 1, a first step for executing chains of FUs 700 can be to build a logical model. Hence, the logical model can be built before execution commences. Next the logical objects can obtain their physical allocation from the resource manager 142 or 1122 and the resource use is committed. As will also be appreciated by those skilled in the art, the commitment of resources in this context may involve a staggered allocation of all of the needed resources over time, rather than an immediate, present commitment of those resources at the same time. The session 128 or user application 1100 may then (and typically not earlier) send a trigger to a P-FU 140 (via the L-FU 134) which starts the data processing.

As previously indicated, a P-FU 140 can be implemented in SW and/or HW. Depending on the implementation the FU 700 may have different properties. An HW P-FU 140 can be configured with a P-FUD. The P-FUD may or may not have an exit area that is supposed to be executed when the main execution is done, which exit area is also referred to herein as a "job mail" since no other "mail" operations are performed while the chain of FUs associated with a task or job are being executed. On the other hand, some HW FUs may not be configured via a P-FUD. In such a case, instead of using a job mail, the HW FUs can be configured using simple write mails. One disadvantage of the latter embodiment is that whereas the job mail guarantees atomic operation of the FUs involved in the job, the write mail embodiments may not guarantee atomic operation since there is nothing present to keep the write mails together in the system.

According to exemplary embodiments, an SW FU can also be configured with a P-FUD. The P-FUD for the SW FU can be viewed as the configuration construct for the FU. An SW FU may have memory, e.g., an FU 700 implementing a filter. The results can be stored in a buffer (or other memory or register), in the P-FUD or in the FU 700 itself (with a static variable). In the latter case, the FU 700 may only be used in one session (since it is not memory-less).

A Session Coordinator (SC) is a specialization of the SW FU. Similar to other FUs 700, the SC communicates with messages. The SC can differ from the normal FU 700 in that the SC is aware of its context and can be used to control the other physical-FUs in runtime. An SC can, for example, redirect, pause, synchronize or forward the processing flow in a session. As an example, suppose a function is to be performed using one FU 700 which uses inputs from two other FUs 700. In this case, an SC can be provided which waits for messages from the two other FUs 700 and, when both have arrived, the SC can forward a message to the FU 700 which is awaiting those two inputs to perform its atomic operation. The SC according to such an embodiment will typically contain a minimal amount of control logic and it is similar to the FU 700 in that it can operate as a small entity that may be reused (depending on complexity). The major difference between an FU 700 and an SC is that the may have knowledge about the session state and dependencies. The SC can be seen as a way for the session object to delegate some tasks to an entity closer to the actual base band processing.

According to exemplary embodiments, and similarly to the FU 700, the SC can be modeled as an L-FU in the session tree which represents the P-FU 140 that implements the function. Since this P-FU 140 has different properties, it is denoted herein as a P-SC.

According to exemplary embodiments, there can be at least three specialized FUs (some of which are seen in FIG. 1) as follows: (1) a timer FU 136 which manages a timing generator TIMGEN, (2) a radio FU 138 which handles a radio and (3) an interface FU which is the interface to the non-FU world. The radio FU 138 can be the first FU in the receiver (RX) chain and the last FU in the transmitter (TX) chain. Additionally, the radio FU 138 can be considered to be a mixed FU, i.e., the radio FU is a SW FU that controls a HW device. Regarding the interface FU, for the data plane, the RX chain can end with an interface FU and the TX chain can start with an interface FU connected to the media access control (MAC) layer. For example, any SW P-FU executing on a processor could serve as an interface FU. A separate interface FU may only be needed when passing information from, for example, a digital signal processor (DSP) or HW FU to the medium access control (MAC) layer or PMSS.

According to the exemplary embodiments described herein, it may be possible using the afore-described FU/FUD framework to allow for one or more of the following: (1) encapsulation of functionality; (2) SW and/or HW implementation which is opaque to the user/application; (3) complete context given for each invocation (e.g. implying improved testability and concurrent use); and/or (4) autonomous, self-triggering chains which can generate a lower interrupt rate in a central micro-controller as compared to conventional methods and systems. When testing an algorithm (HW or SW), the smaller context the algorithm has, the smaller is the state-event space needed to be considered in testing. A well-defined context without unknown dependencies and/or side effects from other parts of the system may therefore be beneficial in a number of ways.

As mentioned above in the example of FIG. 2, FUs 700 and FUDs 702 can be used in a multi-RAT UE for executing various functions associated with the multi-RAT environment. For example, a cell search function is typically performed by the multi-RAT UE when attempting to connect to a network. A cell search explores a carrier frequency to determine whether an actual cell exists on the carrier or whether measured energy is only noise. In this example, a first chain of FUs 2 with their associated FUDs 4 can be executed by the multi-RAT. This first chain can be created and executed for a WCDMA environment to perform a cell search to correlate the measured signal with various scrambling codes (which can be stored in memory) to determine whether a match is found, i.e., whether a cell is found. A second chain can be created and executed for a GSM environment to perform a cell search which decodes a base station identification code (BSIC) to determine that the carrier is associated with an actual cell. Those skilled in the art will appreciate that the foregoing example is purely illustrative and that there will be many different chains of FUs implemented to perform numerous radio functions in a multi-RAT UE or platform designed in accordance with these principles.

Thus, according to an embodiment, an arrangement or device can include a multiple radio access technology (RAT) platform configured to enable communications with a plurality of different RATs using procedures associated with radio functions, wherein the procedures implement the radio functions through functional units (FUs) which perform operations, the FUs being implemented in at least one of hardware and software, and wherein the FUs are configured by functional unit descriptors (FUDs) which instruct an FU (a) from which memory location to fetch data to operate upon, (b) to which memory location to store data as a result of an operation and (c) a message type to output after the operation.

Figure 12:
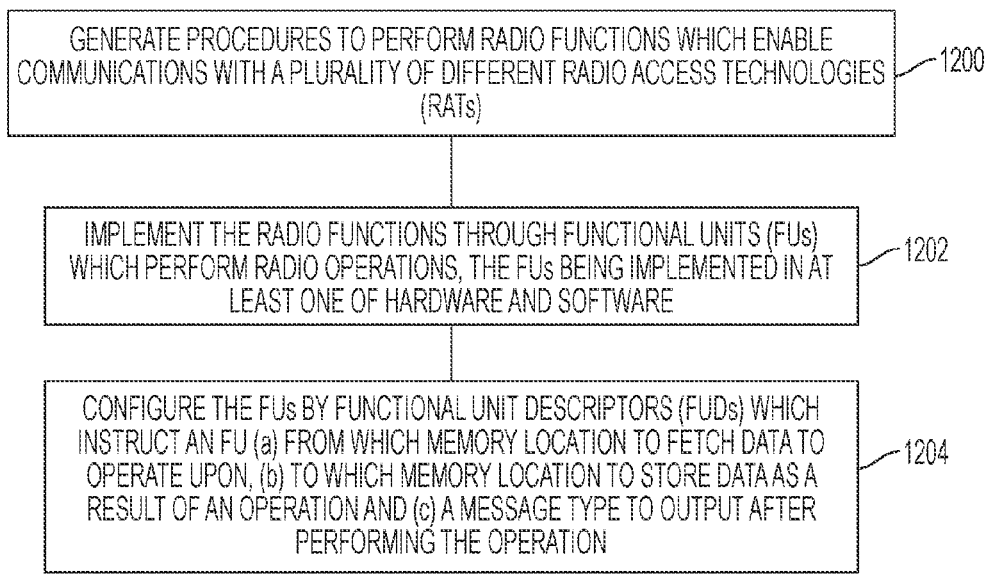
FIG. 12 is a flowchart illustrating a method according to exemplary embodiments.

Similarly, a method for implementing radio communication functions in a decoupled manner is illustrated in the flowchart of FIG. 12. Therein, at step 1200, procedures are generated to perform radio functions which enable communications with a plurality of different radio access technologies (RATs). The radio functions are implemented through functional units (FUs) which perform radio operations, the FUs being implemented in at least one of hardware and software at step 1202. The FUs are configured by functional unit descriptors (FUDs) which instruct an FU (a) from which memory location to fetch data to operate upon, (b) to which memory location to store data as a result of an operation and (c) a message type to output after performing the operation as shown in step 1204.

Radio Planner

As mentioned above, and according to exemplary embodiments, instead of allowing a specific radio access technology's (RAT's) use case, e.g., paging channel (PCH) with measurement, to define how a radio resource (or resources) can be used, a common radio planner 116 (as seen in FIG. 1) in a user equipment (UE) can take all (or some subset of) radio access requests into consideration and then resolve conflicts, e.g., simultaneous conflicts. Thus, before any usage of the radio is performed, a radio time reservation can be requested from the radio planner 116 by a procedure 114 and, if the request is granted, the radio can be used. The radio time can, for example, be specified with a unified time base to avoid any error in RAT time translations. Hence, each RAT module or procedure can send its requests for radio access time to the radio planner 116 and receive a grant or a denial from the radio planner. Each request/reservation can be given a priority by the user, e.g., PCH reception can have a higher priority as compared to measurements. According to an exemplary embodiment, some priorities may additionally or alternatively be set by the end user (a person). For embodiments which include two conflicting reservations the reservation with highest priority can be given access while the other reservation can be declined (or shifted in time if it is a dynamic request as will be explained later).

Figure 13:
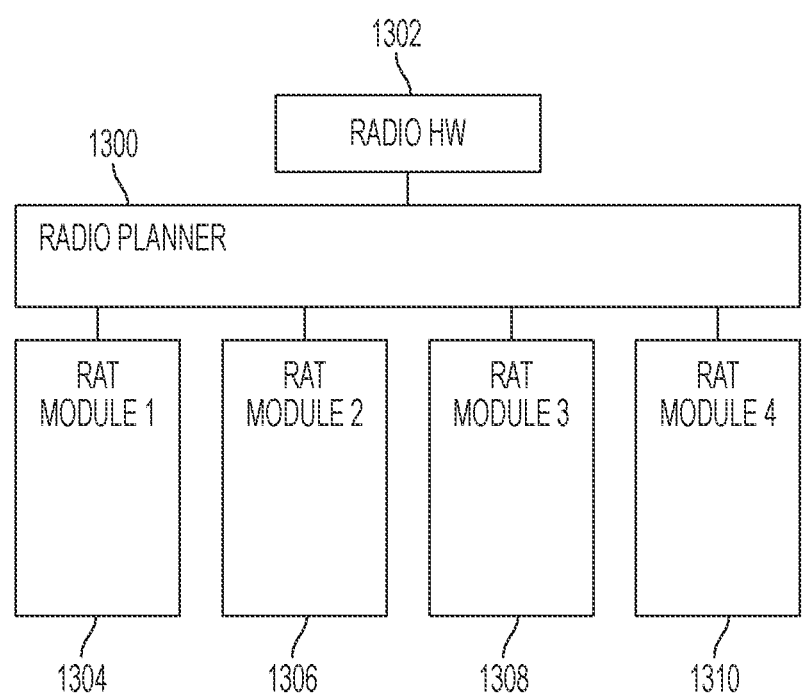
FIG. 13 depicts a radio planner interfacing between a plurality of RAT modules and radio hardware according to an embodiment.

Note that although this discussion regarding the radio planner may be applicable to a radio planner 116 operating in the general Layer 1 software architecture described above, that such radio planners may also be used in other architectures as desired. A more general example of a radio planner 1300 is shown in FIG. 13, wherein a UE, platform, (or other device) can include radio hardware 1302, the radio planner 1300 and a plurality of RAT modules, e.g., RAT Module1 1304, RAT Module2 1306, RAT Module3 1308 and RAT Module4 1310.

According to exemplary embodiments, when access to the radio has been granted to a specific RAT module, the RAT module can use the radio either via the radio planner 1300 or via a separate path depending on the implementation.

According to exemplary embodiments, for some use cases the priorities may change dynamically. For example, a RAT/functionality/request that has been denied may be given a higher priority (i.e. higher probability to be allocated) for the following request, while a RAT/functionality/request that has been allocated may be given a lower priority (i.e. lower probability to be allocated) for the following request. Such a scheme can be applied to all or only some requests depending on the implementation. This exemplary approach can increase the fairness of radio time allocation among a plurality of RAT modules.

According to exemplary embodiments, for some use cases radio activity must be performed at a specific time, e.g., PCH reception can only be performed when the network transmits the PCH message. However, measurements do not specifically need to be done at a specific time and measurements' radio usage is dynamic in the sense that it can be moved in time. As such, if a static reservation, e.g., PCH reception conflicts with a dynamic reservation, it can be feasible to move the dynamic reservation until there is no conflict.

According to exemplary embodiments, each request may, thus, be static or dynamic. Static can mean that the radio access can be for a particular moment in time and a particular duration. Examples of static requests can include when there is a need to read a paging channel, or to perform certain measurements that can only be done at the times when corresponding signaling takes place in the network. Dynamic requests can, for example, mean that the radio access can be required for any moment in time and a particular duration, or for a moment in time located in a certain time interval and a particular duration. Examples of dynamic requests can include a need to perform certain measurements that can be done at any time, or at reasonably regular time intervals.

According to exemplary embodiments, the radio planner 1300 may allocate time to the dynamic requests so that conflicts can be resolved, e.g., between two or more dynamic requests and/or between a static and one or more dynamic requests. Besides inherently preventing radio access conflicts, the radio planner can also enable a more efficient use of the radio. With the knowledge of all radio activities, the radio planner 1300 may move a dynamic reservation closer to a static reservation in order to minimize the radio on-time. Further, the radio planner 1300 may also locate unused radio time to achieve maximum radio usage.

For example, the radio planner 1300 may allocate time to the dynamic requests so that the allocated time for radio usage is bundled together as far as possible. Such an approach may result in longer periods of time when the radio is not allocated. During such periods the radio may be turned off or enter a low power consumption mode, with both alternatives saving power. For another example if an active RAT is in discontinuous reception (DRX) mode, the radio usage time of the other RATs may be scheduled in correlation with the DRX cycle so that the active RAT radio usage can be directly followed (or preceded) by, e.g., measurement times of the other RATs.

According to exemplary embodiments, the radio may be turned off or enter a low power consumption mode even if the allocated time for radio usage is more scattered. However, some time may be needed to turn the radio off and on, or to take the radio in and out of a low power mode. This switching also typically consumes power. Thus, the less on/off switching, the less overhead time is needed and also less power is consumed.

According to exemplary embodiments, with the ability of letting the radio planner 1300 resolve radio usage, the different use cases of how to, e.g., combine PCH and measurements, do not need to be hard coded. Instead, the implementation of PCH and measurements can be done separately and modified independently. The radio planner 1300 can ensure that they are not conflicting by placing the measurement reservation at an unused radio time.

According to exemplary embodiments, the different RAT 1304-1310 modules or procedures can be totally unaware of each other when it comes to radio usage time, since the radio planner 1300 can handle all such issues and the respective RAT can only interface with the radio planner. The radio planner 1300 in turn does not need to know any particulars about the different RATs. The radio planner 1300 can receive the requests (with possible corresponding priorities and/or dynamic/static information) and allocate radio access accordingly.

Exemplary embodiments described herein allow for new RATs to be added to an architecture/implementation without the need to adapt the old RATs. Radio conflicts can be handled in an efficient and fair manner. For example, a RAT/functionality that has been denied access to the radio can be more likely to get its following request granted due to the priority changes. Signaling between blocks becomes very simple as compared to signaling between blocks in conventional multi-RAT devices. Each RAT may only send its request to the radio planner 1300 and then gets the allocation or denial from the radio planner 1300. No signaling between RAT modules is necessary for the purpose of radio time management. Power efficiency can be increased. For example, due to the more efficient signaling and/or a reduction in signaling, less power can be used with the UE. Also, since the radio planner 1300 can schedule the radio on time, and consequently the radio off time, in as large chunks as possible, the radio does not have to be turned on and off so frequently, which reduces power consumption.

Figure 14:
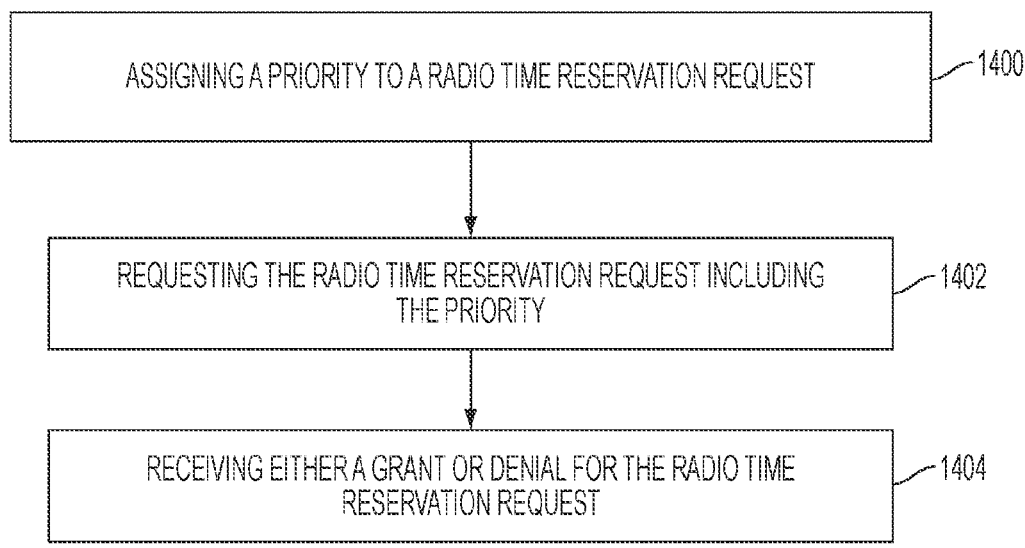
FIGS. 14-15 are flowcharts illustrating methods according to exemplary embodiments.

An exemplary method for avoiding conflicts between a plurality of radio access technology (RAT) module resource requests is illustrated in FIG. 14. Therein, at step 1400 a priority is assigned to a radio time reservation request, at step 1402 the radio time reservation request including the priority is transmitted (e.g., to the radio planner 1300); and at step 1404 either a grant or a denial for the radio time reservation request is received. The radio time is specified with a unified time base for the radio time reservation request according to an embodiment.

Figure 15:
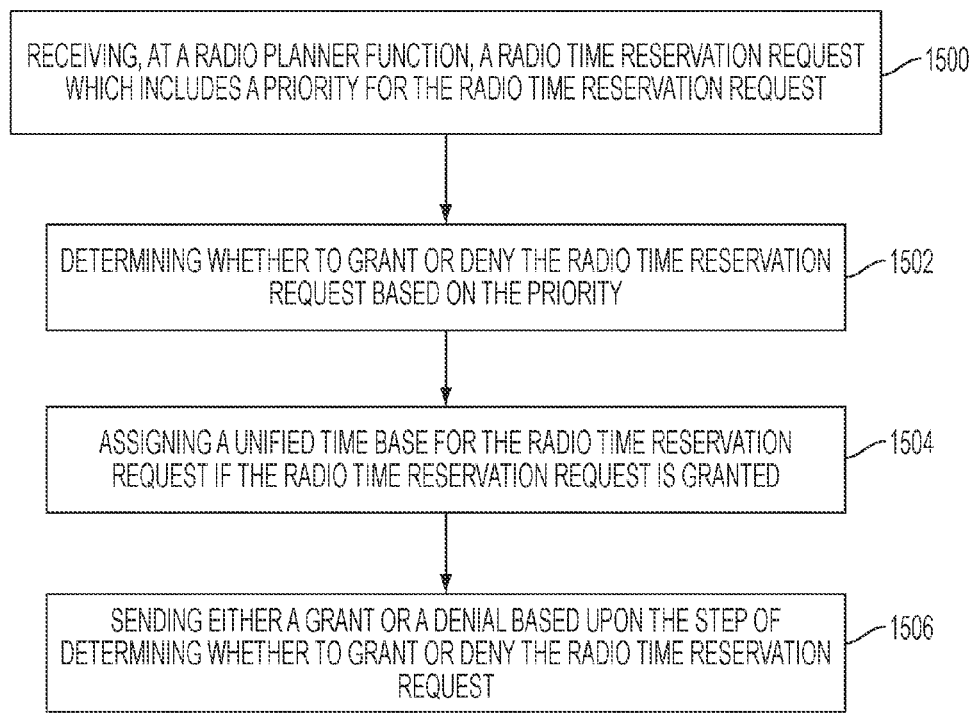

Another exemplary method for avoiding conflicts between a plurality of radio access technology (RAT) module resource requests is illustrated in FIG. 15. Therein, at step 1500, a radio time reservation request is received at a radio planner function, which request includes a priority for the radio time reservation request. At step 1502, it is determined whether to grant or deny the radio time reservation request; at step 1504 assigning a unified time base for the radio time reservation request if the radio time reservation request is granted; and at step 1506 sending either a grant or a denial based upon the step of determining whether to grant or deny the radio time reservation request.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for avoiding conflicts between a plurality of radio access technology (RAT) module resource requests comprising:
   receiving radio time reservation requests at a radio planner function, each of which requests includes a priority value for the radio time reservation request;
   determining, by the radio planner function, whether to grant or deny each of the radio time reservation requests based at least in part on comparison of the priority values; and
   sending either a corresponding grant or a denial based upon the step of determining toward a corresponding radio time reservation requester.

2. The method of claim 1, wherein at least some of said radio time requests are associated with different RAT modules in a same device.

3. The method of claim 2, wherein the different RAT modules include at least two of: a Long Term Evolution (LTE) RAT module, a Global System for Mobile (GSM) communications RAT module, and a Wideband Code Division Multiple Access (WCDMA) RAT module.

4. The method of any of claim 1, further comprising the step of:
   assigning a unified time base for a grant of a radio time reservation request.

5. The method of any of claim 1, further comprising the step of:
   grouping together in time grants of radio time associated with said radio time reservation requests.

6. The method of any of claim 1, wherein said radio time reservation requests include static radio time reservation requests which request radio time at a time instant for a particular duration and dynamic radio time reservation request which request radio time within a time interval for a particular duration.

7. The method of claim 6, further comprising:
   moving, by the radio planner, a granted radio reservation time associated with a dynamic radio time reservation request from a first time to a second time.

8. The method of claim 1, further comprising:
   determining, by the radio planner, that one of the RAT modules is in discontinuous reception (DRX) mode; and
   granting radio time reservation requests associated with other RAT modules for times during which the one of the RAT modules is in the DRX mode.

9. A platform for allocating radio resources among a plurality of radio access technology (RAT) modules comprising:
   radio hardware configured to transmit and receive radio signals over an air interface using the plurality of RATs; and
   a radio planner connected to the radio hardware and configured to receive radio time reservation requests, each of which requests includes a priority value for the radio time reservation request, and to determine whether to grant or deny each of the radio time reservation requests based at least in part on the priority values.

10. The platform of claim 9, wherein the radio planner sends either a corresponding grant or a denial based upon the determination toward a corresponding radio time reservation requester.

11. The platform of claim 9, wherein at least some of said radio time requests are associated with different RAT modules in a same device.

12. The platform of claim 11, wherein the different RAT modules include at least two of: a Long Term Evolution (LTE) RAT module, a Global System for Mobile (GSM) communications RAT module, and a Wideband Code Division Multiple Access (WCDMA) RAT module.

13. The platform of claim 9, wherein the radio planner is further configured to assign a unified time base for a grant of a radio time reservation request.

14. The platform of claim 9, wherein the radio planner is further configured to group together in time grants of radio time associated with said radio time reservation requests.

15. The platform of claim 9, wherein said radio time reservation requests include static radio time reservation requests which request radio time at a time instant for a particular duration and dynamic radio time reservation request which request radio time within a time interval for a particular duration.

16. The platform of claim 15, wherein the radio planner is further configured to move a granted radio reservation time associated with a dynamic radio time reservation request from a first time to a second time.

17. The platform of claim 9, wherein the radio planner is further configured to determine that one of the RAT modules is in discontinuous reception (DRX) mode and to grant radio time reservation requests associated with other RAT modules for times during which the one of the RAT modules is in the DRX mode.

18. A multi-RAT wireless communication device comprising the platform according to claim 9.

19. A non-transitory computer-readable medium containing program instructions which, when executed by a computer or processor, perform the steps of:
  receiving radio time reservation requests at a radio planner function, each of which requests includes a priority value for the radio time reservation request;
  determining, by the radio planner function, whether to grant or deny each of the radio time reservation requests based at least in part on comparison of the priority values; and
  sending either a corresponding grant or a denial based upon the step of determining toward a corresponding radio time reservation requester.

* * * * *